March 16, 1943.     R. M. LEIPPE     2,313,951
WATTHOUR METER
Filed Dec. 13, 1939

WITNESSES:
N. F. Sussex
C. L. Freedman

INVENTOR
Richard M. Leippe.
BY
ATTORNEY

Patented Mar. 16, 1943

2,313,951

UNITED STATES PATENT OFFICE 2,313,951

WATTHOUR METER

Richard M. Leippe, East Orange, N. J., assignor to Westinghouse Electric & Manufacturing Company, East Pittsburgh, Pa., a corporation of Pennsylvania Application December 13, 1939, Serial No. 309,012

7 Claims. (Cl. 171—264)

This invention relates to measuring instruments, and it has particular relation to measuring instruments of the induction watthour-meter type.

It is well known that induction-type instruments must be adjusted or calibrated for operation under predetermined conditions. For example, a watthour meter for operation on a 60-cycle alternating current circuit generally is provided with a lag or quadrature loop for maintaining magnetic fluxes produced by the voltage and current of the alternating current circuit in quadrature at unity power factor. Furthermore, it is customary to provide such an instrument with a light load adjustment in order to compensate the instrument for friction losses.

These adjustments are satisfactory only for predetermined conditions. For example, a watthour meter designed for operation on a 50-cycle alternating current circuit would not be calibrated properly for operation on a 60-cycle alternating current circuit. Heretofore, the conversion of a 50-cycle watthour meter into a 60-cycle watthour meter has necessitated major changes therein and often has required the return of a watthour meter to the manufacturer for recalibration.

In accordance with my invention, a watthour meter intended for operation at either of two frequencies is provided with an auxiliary quadrature loop which has a frangible portion extending toward the exterior of the instrument in order that the quadrature loop may be readily opened. This auxiliary quadrature loop is applied to a watthour meter calibrated for operation at a predetermined frequency, such as 60 cycles. The addition of the auxiliary quadrature loop is designed to vary the calibration for operation on a lower frequency such as 50 cycles. Consequently, by opening the auxiliary quadrature loop, the instrument is readily recalibrated for operation at the higher frequency.

A second recalibration may be effected by the opening of the auxiliary quadrature loop in order to recalibrate the watthour meter for proper light load compensation. This may be effected by mounting the auxiliary quadrature loop dissymmetrically relative to the potential pole on which it is mounted. The effect of the dissymmetric mounting is to produce, by current flowing in an auxiliary quadrature loop, an effective magnetic pole which is displaced from the magnetic pole otherwise produced by the watthour meter. Therefore, when the frangible portion of the quadrature loop is broken not only is the watthour meter properly lagged for operation at the higher frequency but the light load calibration also is properly modified for operation at the higher frequency.

When a quadrature loop is applied to a laminated potential pole, the electro-conductive loop might tend to short circuit the laminations which it surrounds. The effect of such a short circuit is to provide local paths for eddy currents thereby causing variations in the effect of the quadrature loop. In accordance with a further aspect of my invention, a portion of the quadrature loop normally bridging the laminations of the potential pole is spaced from the laminations in order to prevent any short circuiting thereof. In addition, the auxiliary quadrature loop may be coated with an insulating material.

It is, therefore, an object of my invention to provide an induction instrument which may be readily recalibrated for operation under predetermined operating conditions.

It is a further object of my invention to provide an induction instrument with means readily operable for maintaining quadrature between potential and current fluxes at a predetermined phase angle under several operating conditions.

It is a further object of my invention to provide an induction instrument with an auxiliary quadrature or lag loop which may be readily broken for recalibrating the instrument.

It is another object of my invention to provide an induction instrument with an electro-conductive loop effective when broken for recalibrating the instrument for proper light-load operation under different operating conditions.

It is another object of my invention to provide an electro-conductive loop for the laminated pole of an inductive instrument which cannot short circuit the laminations of the pole.

It is still a further object of my invention to provide an improved method for recalibrating an induction instrument designed for operation at a predetermined frequency for operation at a different frequency.

Other objects of my invention will be apparent from the following description taken in conjunction with the accompanying drawing, in which.

Figure 1:
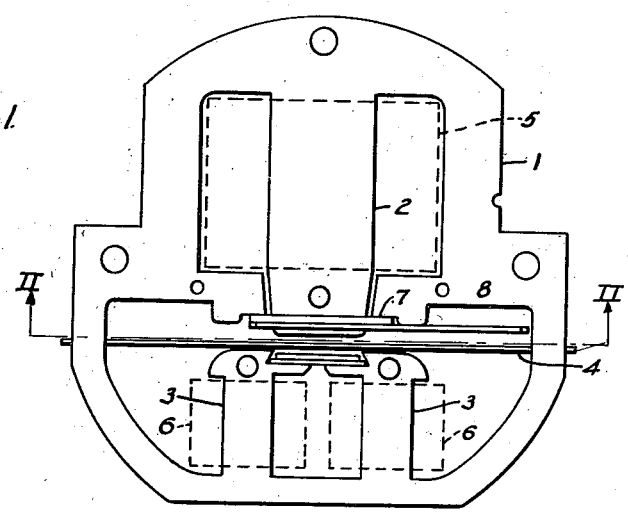
Figure 1 is a view in rear elevation of a watthour meter embodying my invention.
Figure 4:
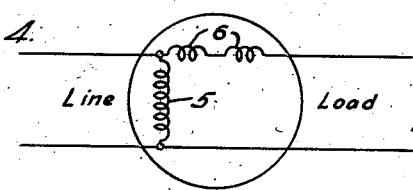
Fig. 4 is a diagrammatic view showing suitable connections for an instrument designed in accordance with my invention.

Referring to the drawing, Figure 1 shows an electromagnet 1 suitable for a watthour meter. This electromagnet has a potential pole 2 and current or series poles 3 which are spaced to define an air gap in which an electro-conductive disc 4 is mounted for rotation. The potential pole 2 is surrounded by a potential winding 5 which is energized in accordance with the voltage of a circuit with which the watthour meter is associated. Similarly, current windings 6 surround the current poles 3 and are energized in accordance with the current flowing through the circuit with which the watthour meter is associated. These connections for the windings are illustrated diagrammatically in Fig. 4.

As well known in the art, a phase displacement is necessary between flux passing through the potential pole 2 and flux produced in the current poles 3 in order to produce rotation of the disc 4. In the construction generally employed, the potential winding 5 has a large number of turns of fine wire and consequently has a high inductance. Because of this inductance, a phase displacement of approximately 90° is present between current flowing in the potential winding 5 and the voltage applied thereacross. Since the current flowing in the current winding 6 normally is substantially in phase with the current flowing in the alternating current circuit with which the watthour meter is associated, it follows that at unity power factor the currents flowing in the potential and current windings are displaced approximately 90° from each other.

If accurate measurements are desired, it is necessary that the displacement in phase between the currents flowing in the current and potential windings have a predetermined value at a predetermined power factor, generally 90° at unity power factor for a watthour meter. The inductance of the potential winding 5 ordinarily is not enough to assure such a phase displacement. Consequently, it is the practice to employ in a watthour meter a quadrature or lag plate which serves to increase the lag of flux passing through the potential pole and to produce the desired phase displacement.

In Fig. 1, a quadrature or lag plate or loop 7 encircles the potential pole 2 adjacent the air gap. This lag plate is constructed from electro-conductive material such as brass and is in inductive relationship relative to magnetic flux passing through the potential pole. As well understood in the art, this lag plate may be proportioned to provide the desired phase displacement at a predetermined frequency.

As above indicated, watthour meters often are designed for operation at a predetermined frequency such as 50 cycles per second and later changed for operation on circuits having a different frequency such as 60 cycles per second. When a watthour meter is changed from a circuit of one frequency to a circuit of another frequency, the performance characteristics thereof are appreciably affected. For example, the inductive reactance of the potential winding 5 is a function of frequency. Consequently, when a watthour meter is changed from a 50-cycle circuit to a 60-cycle circuit unless suitable compensation is provided, the watthour meter will be overlagged. In the prior art, no convenient method for compensating a watthour meter under such conditions has been provided.

In accordance with my invention, a watthour meter which may be employed for measuring power at either of two frequencies is provided with two distinct quadrature or lagging devices. One of these devices comprises the lag loop or plate 7, and the watthour meter is compensated by this lag plate for operation with an alternating current circuit of a predetermined frequency such as 60 cycles per second. In addition, a second auxiliary quadrature or lag loop or plate 8 is provided which increases the lagging of the watthour meter sufficiently to compensate it for operation on an alternating current circuit of a lower frequency such as 50 cycles per second. When it is desired to convert the watthour meter from operation on a circuit at 50 cycles per second to operation on a circuit at 60 cycles per second, the circuit of the auxiliary quadrature or lag loop 8 may be broken in order to render the quadrature or lag plate ineffective.

It is to be understood that either of the lag plates or loops 7 or 8 may be constructed of one or more turns of electro-conductive material.

When in assembled condition, a watthour meter ordinarily is so arranged that its quadrature or lag loop is substantially not accessible. In many cases, a substantial dismantling of the watthour meter is necessary in order to permit removal of a quadrature or lag loop. In order to provide a convenient control point for the auxiliary quadrature or lag loop 8, I provide this loop with a frangible extension 9 which extends away from the potential pole 2 towards the exterior of the watthour meter. Consequently, by breaking the frangible extension 9 at any convenient point such as at the point A, the auxiliary quadrature loop 8 may be rendered ineffective, and the watthour meter consequently is calibrated for operation at 60 cycles per second. If desired, the auxiliary quadrature loop may be of reduced cross-section or otherwise weakened at the point A to facilitate severance thereof.

A second discrepancy in operation of a watthour meter when designed for operation under either of two conditions occurs in the light-load adjustment which, as is well known, is intended to compensate for friction losses in the rotating assembly of a watthour meter. By suitably designing the auxiliary quadrature or lag loop 8, I have found it possible to compensate a meter not only for proper phase angle correction but also for proper light-load correction when a watthour meter is to be converted for operation at a different frequency.

Figure 2:
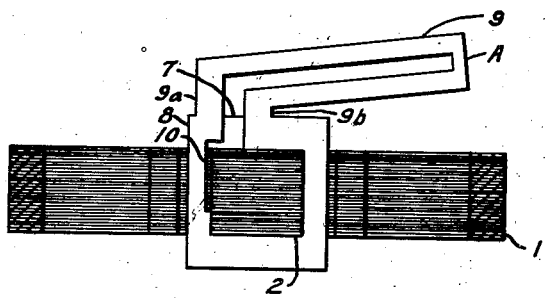
Fig. 2 is a view in section taken along the line II—II of Fig. 1, and showing an auxiliary lag loop or plate embodying my invention.

Referring to Fig. 2, it will be noted that the frangible extension 9 is connected to the main portion of the auxiliary quadrature loop 8 at points 9a and 9b which are dissymmetric relative to that center line of the potential pole 2 which extends at right angles to the plane of the electromagnet. Because of this dissymmetry the magnetic pole produced by current flowing through the auxiliary lag loop 8 is displaced relative to the effective pole produced by magnetic flux passing through the potential pole which is produced by the potential winding 5 alone. The effect of this displacement is to provide a shifting or shading action on the potential pole resultant flux. This shading action may be so proportioned that when the loop 8 is rendered ineffective by the breakage of the frangible extension 9, the loss of the shading action of the auxiliary loop 8 is sufficient to compensate the watthour meter for light load when operated at a frequency of 60 cycles per second.

The action of the auxiliary loop 8 may be explained more fully by assuming that current is flowing in the auxiliary loop. Such current is produced by alternating magnetic flux passing through the potential pole 2. Since the major portion of the auxiliary loop fits closely about the potential pole 2, the current flowing therethrough produces magnetic flux uniformly throughout the potential pole. However, at the points 9a and 9b, the current flowing in the auxiliary loop is diverted away from the potential pole through the frangible extension 9. Consequently, adjacent these points the magnetic flux produced in the potential pole will be less than that produced elsewhere and the effective magnetic pole produced by the current flowing in the auxiliary loop will be displaced in a direction away from the points 9a and 9b.

In most watthour meters intended for operation on alternating current circuits, the electromagnet 1 is constructed from thin laminations of iron. The purpose of these laminations is to break up paths for eddy currents induced in the electromagnet by the alternating currents flowing in the energizing windings. When electroconductive material such as that present in the quadrature or lag loops is placed adjacent and abutting the laminations, it sometimes happens that the electro-conductive material conductively bridges two or more laminations, thereby producing local circuits for eddy currents. Such local circuits are undesirable.

The formation of these local circuits may be prevented to some extent by coating the quadrature or lag loops with an insulating material such as the insulating lacquers or resins well known in the art. A still further safeguard may be provided, however, by recessing one or more arms of the lag loop which normally bridge the laminations. Such a construction has been illustrated in Fig. 2, wherein the lag loop 8 is provided with a recess 10 which serves to space a portion of the lag loop normally bridging the potential pole laminations therefrom.

Figure 3:
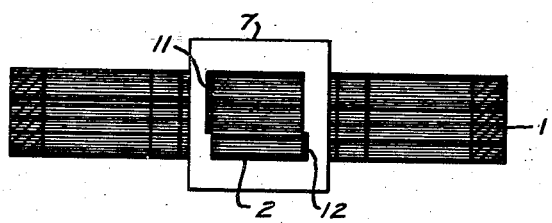
Fig. 3 is a view in section taken along the line II—II of Fig. 1, but with the auxiliary lag loop or plate removed.

Similar safeguards against the formation of local circuits may be applied to the main quadrature or lag loop 7. For example, as illustrated in Fig. 3, the main lag loop is provided with two recesses 11 and 12 which effectively prevent the formation of such local circuits. Obviously, the number and position of the recesses may be varied appreciably. For the purpose of illustration, however, two typical arrangements have been illustrated in Figs. 2 and 3.

It is believed that the operation of a watthour meter designed in accordance with my invention will be apparent from the foregoing description. A watthour meter intended for operation on an alternating current at a frequency of 50 cycles per second, and which later is expected to operate at a frequency of 60 cycles per second, is provided with the main quadrature or lag loop 7 and the auxiliary quadrature or lag loop 8 as above described. When so constructed, the watthour meter may be operated on a 50 cycle circuit.

When the watthour meter is to be converted for operation at 60 cycles per second, the auxiliary quadraure or lag loop 8 is interrupted at any convenient point such as at the point A of Fig. 2. This results in two corrections which condition the watthour meter for operation at 60 cycles per second. In the first place, the opening of the auxiliary loop 8 decreases the lagging of the meter sufficiently for operation at the higher frequency. In the second place, the opening of the lag loop 8 terminates the shading action of the lag loop and corrects the light load adjustment of the watthour meter for operation at the higher frequency.

Although I have described my invention with reference to certain specific embodiments thereof, it is obvious that numerous modifications thereof are possible. Therefore, I do not wish my invention to be restricted except as required by the appended claims.

I claim as my invention:

1. In an induction meter, an electromagnetic structure including voltage and current poles and means for producing in said poles magnetic fluxes controlled respectively by the voltage and current of an alternating current circuit, a first quadrature loop mounted on one of said poles for maintaining a quadrature relationship between the magnetic fluxes in said voltage and current poles at a first predetermined frequency and at a first power factor of an alternating current circuit, and an auxiliary non-adjustable quadrature loop mounted on said one of said poles and effective with said first quadrature loop for maintaining a quadrature relationship between the magnetic fluxes in said voltage and current poles at a second predetermined frequency and at said first power factor of an alternating current circuit, said auxiliary quadrature loop having a portion accessible when said meter is in assembled condition whereby said auxiliary quadrature loop may be opened, and said quadrature loops being positioned adjacent each other to surround substantially the same portion of said magnetic fluxes.

2. In an integrating induction instrument, an electromagnetic structure for providing a main shifting magnetic field, said electromagnetic structure including voltage responsive means for producing a magnetic flux, an armature member, means mounting said armature member for rotation by said magnetic field, means for producing an auxiliary shifting field controlled by magnetic flux produced by said voltage-responsive means for compensating said instrument for friction losses at a first predetermined operating frequency, and electroconductive auxiliary means embracing at least part of said magnetic flux for modifying said shifting auxiliary field for compensating said instrument for friction losses at a second predetermined operating frequency, said auxiliary means having a portion accessible for rendering said auxiliary means ineffective, whereby when said auxiliary means is rendered ineffective said instrument is conditioned for operation at said first predetermined operating frequency.

3. In an induction instrument, an electromagnetic structure including first pole means for carrying a first magnetic flux controlled by the voltage of an electrical circuit and second pole means for carrying a second magnetic flux controlled by the current of an electrical circuit, said pole means cooperating when energized to produce a shifting magnetic field, an electro-conductive armature member, means mounting said armature member for rotation by said magnetic field, and a plurality of adjacent electro-conductive stationary loops surrounding substantially a common portion of said first magnetic flux which passes through said armature member, one of said loops having a frangible portion extending towards the exterior of said instrument.

4. In an induction instrument, an electromagnetic structure including first pole means for carrying a first magnetic flux controlled by the voltage of an electrical circuit and second pole means for carrying a second magnetic flux controlled by the current of an electrical circuit, said pole means cooperating when energized to produce a shifting magnetic field, an electro-conductive armature member, means mounting said armature member for rotation by said magnetic field, and an electro-conductive loop surrounding said first pole means adjacent said armature member and having a frangible portion extending towards the exterior of said instrument, said frangible portion being connected to the remainder of said loop at points such that current flowing in said loop produces a magnetic flux having an effective center of density displaced around the axis of rotation of said armature member from the center of said first pole means.

5. In an induction watthour meter, an electromagnetic structure having a laminated potential pole member and current pole members, said pole members being positioned for establishing a shifting magnetic field across an air gap, an electro-conductive disc having a portion positioned within said air gap, means mounting said disc for rotation, and a calibrating device for establishing a quadrature relationship between magnetic flux passing through said potential pole member and magnetic flux passing through said current pole members, said calibrating device comprising an electro-conductive lag loop substantially surrounding said potential pole member adjacent said air gap and fixed relative thereto, said lag loop having a first portion extending across the laminations of said potential pole member but spaced therefrom and having a second frangible portion extending away from said potential pole member towards the exterior of said watthour meter, said second portion being connected to the remainder of said lag loop at spaced points so positioned that the effective magnetic pole produced by current flowing through said lag loop is displaced around the axis of rotation of said disc from the physical potential pole member, whereby said lag loop also serves to compensate said watthour meter for friction losses.

6. In an alternating current induction meter designed for operation at either of two frequencies, an electromagnetic structure including first pole means for carrying a first magnetic flux controlled by the voltage of an electrical circuit and second pole means for carrying a second magnetic flux controlled by the current of an electrical circuit, said pole means being spaced for defining an air gap therebetween and cooperating when energized to produce a shifting magnetic field in said air gap, an electroconductive armature member, means mounting said armature member for rotation by said magnetic field, a first electroconductive closed loop surrounding said first pole means adjacent said air gap, said closed loop being proportioned to establish a predetermined relationship between the magnetic fluxes produced in said air gap at a first alternating current frequency, and a second nonadjustable electroconductive closed loop surrounding said first pole means adjacent said air gap, and having an accessible severable portion, said second loop being proportioned to coact with said first loop for maintaining said predetermined relationship at a second alternating current frequency.

7. In an alternating current induction meter designed for operation at either of two frequencies, an electromagnetic structure including first pole means for carrying a first magnetic flux controlled by the voltage of an electrical circuit and second pole means for carrying a second magnetic flux controlled by the current of an electrical circuit, said pole means being spaced for defining an air gap therebetween and cooperating when energized to produce a shifting magnetic field in said air gap, an electroconductive armature member, means mounting said armature member for rotation by said magnetic field, said meter having a predetermined no-load adjustment at a first alternating current frequency, a first electroconductive closed loop surrounding said first pole means adjacent said air gap, said closed loop being proportioned to establish a predetermined phase relationship between the magnetic fluxes produced in said air gap at said first alternating current frequency, and a second electroconductive closed loop surrounding said first pole means adjacent said air gap, and having an accessible severable portion, said second loop being proportioned to coact with said first loop for maintaining said predetermined relationship at a second alternating current frequency, and said second loop having an asymmetric configuration relative to the pole face of said first pole means for preserving said predetermined no-load adjustment at said second alternating current frequency.

RICHARD M. LEIPPE.